US008001037B2

(12) United States Patent
Gershon (10) Patent No.: US 8,001,037 B2
(45) Date of Patent: *Aug. 16, 2011

(54) METHOD AND SYSTEM FOR PRICING OPTIONS

(75) Inventor: David Gershon, Tel Aviv (IL)

(73) Assignee: Super Derivatives, Inc., New York, NY (US)

( * ) Notice: Subject to any disclaimer, the term of this patent is extended or adjusted under 35 U.S.C. 154(b) by 514 days.

This patent is subject to a terminal disclaimer.

(21) Appl. No.: 11/797,692

(22) Filed: May 7, 2007

(65) Prior Publication Data

US 2007/0208659 A1    Sep. 6, 2007

Related U.S. Application Data

(63) Continuation of application No. 10/220,159, filed as application No. PCT/US01/12264 on Apr. 13, 2001, now Pat. No. 7,315,838.

(60) Provisional application No. 60/197,622, filed on Apr. 13, 2000.

(51) Int. Cl.
G06Q 40/00    (2006.01)
(52) U.S. Cl. ............................................ 705/37; 705/35
(58) Field of Classification Search ................ 705/36 R, 705/37, 35
See application file for complete search history.

(56) References Cited

U.S. PATENT DOCUMENTS

| 3,933,305 | A | | 1/1976 | Murphy | |
|---|---|---|---|---|---|
| 5,557,517 | A | * | 9/1996 | Daughterty, III | 705/37 |
| 5,806,050 | A | | 9/1998 | Shinn et al. | |
| 5,873,071 | A | | 2/1999 | Ferstenberg et al. | |
| 5,926,801 | A | | 7/1999 | Matsubara et al. | |
| 5,946,667 | A | | 8/1999 | Tull, Jr. et al. | |
| 6,016,483 | A | * | 1/2000 | Rickard et al. | 705/36 R |
| 6,061,662 | A | | 5/2000 | Makivic | |
| 6,161,096 | A | * | 12/2000 | Bell | 705/36 R |
| 6,178,406 | B1 | | 1/2001 | Cheetham et al. | |
| 6,263,321 | B1 | * | 7/2001 | Daughtery, III | 705/36 R |

(Continued)

FOREIGN PATENT DOCUMENTS

JP    H3-50687 A    3/1991

(Continued)

OTHER PUBLICATIONS

The Influence of Electronic Trading on Bid-Ask Spreads: New Evidence from European Bond Futures; The Journal of Fixed Income; vol. 8, No. 1; Jun. 1998.*

(Continued)

*Primary Examiner* — Hani M Kazimi
*Assistant Examiner* — Abhishek Vyas
(74) *Attorney, Agent, or Firm* — Shiloh et al.

(57) ABSTRACT

A method for providing a bid price and/or an offer price of an option relating to an underlying asset, the method including the steps of receiving first input data corresponding to a plurality of parameters defining the option, receiving second input data corresponding to a plurality of current market conditions relating to the underlying value, computing a corrected theoretical value of the option based on the first and second input data (110), computing a bid/offer spread of the option based on the first and input data (116), computing a bid price and/or an offer price of the option based on the corrected theoretical value and the bid/offer spread (118), and providing an output corresponding to the bid price and/or the offer price of the option.

47 Claims, 6 Drawing Sheets

U.S. PATENT DOCUMENTS

| | | | |
|---|---|---|---|
| 6,546,375 B1 * | 4/2003 | Pang et al. ............... | 705/37 |
| 6,709,330 B1 | 3/2004 | Klein et al. | |
| 6,839,686 B1 | 1/2005 | Galant | |
| 6,912,511 B1 * | 6/2005 | Eliezer et al. ............ | 705/37 |
| 7,177,833 B1 * | 2/2007 | Marynowski et al. ...... | 705/38 |
| 7,251,629 B1 * | 7/2007 | Marynowski et al. ...... | 705/37 |

FOREIGN PATENT DOCUMENTS

| | | |
|---|---|---|
| JP | 2000507730 A1 | 6/2000 |
| JP | 2000500653 A1 | 1/2001 |
| WO | 98/12658 A1 | 3/1998 |
| WO | 98/12659 A1 | 3/1998 |

OTHER PUBLICATIONS

§ Shiekh et al. "A characterization of the daily and intraday behavior of returns on options." Jun. 1994 Journal of Finance, v49, n2, p. 557 (23).*

Customized Listed Contracts: The CBOE's new customizable options contract business is getting good reviews from potential investors.Wall Street & Technology , p. 56. May 1993.*

Using options the special way. Simons, Howard L. Futures (Cedar Falls, Iowa) , v23 , n8 , p34(3) Jul. 1994.*

"Track Data Announces its AIQ Systems Division Released its Option Analysis", Business Wire, Nov. 9, 1999.

Huang, Roger D., et al, "The Components of the Bid-Ask Spread: A General Approach", The Review of Financial Studies, Winter 1997; 10, 4.

Downes, John, et al, "Barron's Dictionary of Finance and Investment Terms, "Derivative Pricing Models" and "Option Pricing", Copyright 1998.

Jex, Mark, et al, "Pricing Exotics under the Smile", Risk, Nov. 1999.

Final Office Action from U.S. Appl. No. 10/492,402, mailed on Jun. 22, 2009.

Shiekh et al. "A characterization of the daily and intraday behavior of returns on options" Jun. 1994 Journal of Finance, v49, n2, p. 557(23).

Final Office Action for U.S. Appl. No. 11/797,691 mailed on Nov. 13, 2009.

Final Office Action for U.S. Appl. No. 12/762,340 mailed on Feb. 18, 2011.

Extended European Search Report for European Patent Application 10191976.9 mailed on Apr. 8, 2011.

Office Action for Indian Patent Application 320/CHENP/2007 mailed on Feb. 28, 2011.

Statement in accordance with the notice from the European Patent Office dated Oct. 1, 2007 concerning business methods (OJ Nov. 2007; p. 592-593) XP002456252.

Office Action for Japanese Patent Application 2001-577256 mailed on Jan. 27, 2011.

Takeaki Kariya, "Basics of Financial Engineering" Japan, Tokyo Keizai, Inc. Sep. 25, 1997, the first edition, p. 11 to 12.

Extended European Search Report for European Patent Application 10180297.3 mailed on Feb. 21, 2011.

Internet Citation, "Track data announces its AIQ systems division released its option analysis", Nov. 9, 1999, XP002958101, retrieved on Jun. 15, 2002.

* cited by examiner

METHOD AND SYSTEM FOR PRICING OPTIONS

CROSS-REFERENCE TO RELATED APPLICATIONS

This application is a Continuation Application of U.S. patent application Ser. No. 10/220,159, filed Mar. 27, 2002 now U.S. Pat. No. 7,315,838 which is a National Phase Application of PCT International Application No. PCT/US01/12264, International Filing Date Apr. 13, 2001, which in turn claims the benefit of U.S. Provisional Patent Application 60/197,622, filed Apr. 13, 2000, the entire disclosures of all of which are incorporated herein by reference.

FIELD OF THE INVENTION

The invention relates generally to financial instruments and, more specifically, to methods and systems for pricing financial derivatives and for providing automatic trading capabilities.

BACKGROUND OF THE INVENTION

Pricing financial instruments, e.g., financial derivatives, is a complex art requiring substantial expertise and experience. Trading financial instruments, such as options, involves a sophisticated process of pricing typically performed by a trader.

The term "option" in the context of the present application is defined broadly as any financial instrument having option-like properties, e.g., any financial derivative including an option or an option-like component. This category of financial instruments may include any type of option or option-like financial instrument, relating to some underlying asset. Assets as used in this application include anything of value; tangible or non-tangible, financial or non-financial. For example, as used herein, options range from a simple Vanilla option on a single stock and up to complex convertible bonds whose convertibility depends on some key, e.g., the weather.

The price of an asset for immediate (e.g., 2 business days) delivery is called the spot price. For an asset sold in an option contract, the strike price is the agreed upon price at which the deal is executed if the option is exercised. For example, a foreign exchange (FX) option involves buying or selling an amount of one currency for an amount of another currency. The spot price is the current exchange rate between the two currencies on the open market. The strike price is the agreed upon exchange rate of the currency if the option is exercised.

To facilitate trading of options and other financial instruments, a trader prepares a bid price and offer price (also called ask price) for a certain option. The bid price is the price at which the trader is willing to purchase the option and the offer price is the price at which the trader is willing to sell the option. When another trader is interested in the option the first trader quotes both the bid and offer prices, not knowing whether the second trader is interested in selling or buying. The offer price is higher than the bid price and the difference between the offer and bid is referred to as bid-offer spread.

A call option is an option to buy an asset at a certain price (i.e., a strike price) on a certain date. A put option is an option to sell an asset at a strike price on a certain date. At any time prior to the option expiration date, the holder of the option may determine whether or not to exercise the option, depending on the current exchange rate (spot) for that currency. If the spot (i.e., current market) price is lower than the strike price, the holder may choose not to exercise the call option and lose only the cost of the option itself. However, if the strike is lower than the spot, the holder may exercise the right to buy the currency at the strike price making a profit equal to the difference between the spot and the strike prices.

A forward rate is the future exchange rate of an asset at a given future day on which the exchange transaction is performed based on an option contract. The forward rate is calculated based on a current rate of the asset, a current interest rate prevailing in the market, expected dividends (for stocks), cost of carry (for commodities), and other parameters depending on the underlying asset of the option.

An at-the-money forward option (ATM) is an option whose strike is equal to the forward rate of the asset. In this application, at-the-money forward options are generically referred to as at-the-money options, as is the common terminology in the foreign exchange (FX) and other financial markets. An in-the-money call option is a call option whose strike is below the forward rate of the underlying asset, and an in-the-money put option is a put option whose strike is above the forward rate of the underlying asset. An out-of-the-money call option is a call option whose strike is above the forward rate of the underlying asset, and an out-of-the-money put option is a put option whose strike is below the forward rate of the underlying asset.

An exotic option, in the context of this application, is a generic name referring to any type of option other than a standard Vanilla option. While certain types of exotic options have been extensively and frequently traded over the years, and are still traded today, other types of exotic options had been used in the past but are no longer in use today. Currently, the most common exotic options include are "barrier" options, "binary" options, "digital" options, "partial barrier" options (also known as "window" options), "average" options and "quanto" options. Some exotic options can be described as a complex version of the standard (Vanilla) option. For example, barrier options are exotic options where the payoff depends on whether the underlying asset's price reaches a certain level, hereinafter referred to as "trigger", during a certain period of time. The "pay off" of an option is defined as the cash realized by the holder of the option upon its expiration. There are generally two types of barrier options, namely, a knock-out option and a knock-in option. A knock-out option is an option that terminates if and when the spot reaches the trigger. A knock-in option comes into existence only when the underlying asset's price reaches the trigger. There are many other types of exotic options known in the art.

The Black-Scholes model (developed in 1975) is a widely accepted method for valuing options. This model calculates a probability-based theoretical value (TV), which is commonly used as a starting point for approximating option prices. This model is based on a presumption that the change in the rate of the asset generally follows a Brownian motion, as is known in the art. Using such Brownian motion model, known also as a stochastic process, one may calculate the theoretical price of any type of financial derivative, either analytically, as is the case for the exotic options discussed above, or numerically. The original Black Scholes model is designed for calculating theoretical prices for Vanilla options. However, it should be understood that any reference in this application to the Black-Scholes model refers to use of any model known in the art for calculating theoretical prices of options, e.g., a Brownian motion model, as applied to any type of option, including exotic options.

It is appreciated by persons skilled in the art that the Black-Scholes model is a limited approximation that may yield results very far from real market prices and, thus, corrections to the Black-Scholes model must generally be added by traders. In the foreign exchange (FX) Vanilla market, for example, the market trades in volatility terms and the translation to option price is performed through use of the Black-Scholes formula. In fact, traders commonly refer to using the Black-Scholes model as "using the wrong volatility with the wrong model to get the right price".

In order to adjust the price, in the Vanilla market, traders use different volatilities for different strikes, i.e., instead of using one volatility per asset, a trader may use different volatility values for a given asset depending on the strike price. This adjustment is known as volatility "smile" adjustment. The origin of the term "smile", in this context, is in the foreign exchange market, where the volatility of a commodity becomes higher as the commodity's price moves further away from the ATM strike.

The phrase "market price of a derivative" is used herein to distinguish between the single value produced by some benchmark models, such as the Black-Scholes model, and the actual bid and offer prices traded in the real market. For example, in some options, the market bid side may be twice the Black-Scholes model price and the offer side may be three times the Black-Scholes model price.

Many exotic options are characterized by discontinuity of the payout and, therefore, a discontinuity in some of the risk parameters near the trigger(s). This discontinuity prevents an oversimplified model such as the Black-Scholes model from taking into account the difficulty in risk-managing the option. Furthermore, due to the peculiar profile of some exotic options, there may be significant transaction costs associated with re-hedging some of the risk factors. Existing models, such as the Black-Scholes model, completely ignore such risk factors.

Many factors may be taken into account in calculating option prices and corrections. (Factor is used herein broadly as any quantifiable or computable value relating to the subject option.) Some of the notable factors are defined as follows:

Volatility ("Vol") is a measure of the fluctuation of the return realized on an asset. An indication of the level of the volatility can be obtained by the volatility history, i.e., the standard deviation of the return of the assets for a certain past period. However, the markets trade based on a volatility that reflects the market expectations of the standard deviation in the future. The volatility reflecting market expectations is called implied volatility. In order to buy/sell volatility one commonly trades Vanilla options. For example, in the foreign exchange market, the implied volatilities of ATM Vanilla options for many frequently used option dates and currency pairs are available to users in real-time, e.g., via screens such as REUTERS, Bloomberg, TELERATE, CantorFitzgerald, or directly from FX option brokers.

Volatility smile, as discussed above, relates to the behavior of the implied volatility with respect to the strike, i.e., the implied volatility as a function of the strike, where the implied volatility for the ATM strike is the given ATM volatility in the market. For example, for currency options, a plot of the implied volatility as a function of the strike shows a minimum in the vicinity of the ATM strike that looks like a smile. For equity options, as another example, the volatility plot tends to be monotonous.

Vega is the rate of change in the price of an option or other derivative in response to changes in volatility, i.e., the partial derivative of the option price with respect to the volatility.

Convexity is the second partial derivative of the price with respect to the volatility, i.e. the derivative of the Vega with respect to the volatility, denoted dVega/dVol.

Delta is the rate of change in the price of an option in response to changes in the price of the underlying asset; in other words, it is a partial derivative of the option price with respect to the spot. For example, a 25 delta call option means that if against buying 1 unit of the option, 0.25 unit of the underlying asset are sold, then for small changes in the underlying option, assuming all other factors are unchanged, the total change in the price of the option and the 0.25 unit of asset is null.

Intrinsic value (IV) for in-the-money knock-out/knock-in exotic options with strike K and trigger (or barrier) B, is defined as IV=|B−K|/B. For a call option, the intrinsic value is the greater of the excess of the asset price over the strike price and zero. In other words, the intrinsic value of in-the-money knock out options is the intrinsic value of a corresponding Vanilla at the barrier, and represents the level of payout discontinuity in the vicinity of the trigger.

25Δ Risk Reversal (RR) is the difference between the implied volatility of a call option and a put option with the same delta (in opposite directions). Traders in the currency options market generally use 25 delta RR, which is the difference between the implied volatility of a 25 delta call option and a 25 delta put option. Thus, 25 delta RR is calculated as follows:

$$25 \text{ delta RR} = \text{implied Vol}(25 \text{ delta call}) - \text{implied Vol}(25 \text{ delta put})$$

The 25 delta risk reversal is characterized by a slope of Vega with respect to spot but practically no convexity at the current spot. Therefore it is used to price the slope dVega/dspot.

25Δ Strangle is the average of the implied volatility of the call and the put, which usually have the same delta. For example:

$$25 \text{ delta strangle} = 0.5(\text{implied Vol}(25 \text{ delta call}) + \text{implied Vol}(25 \text{ delta put}))$$

The 25 delta strangle is characterized by practically no slope of Vega with respect to spot at the current spot, but a lot of convexity. Therefore it is used to price convexity. Since the at-the-money Vol is always known, it is more common to quote the butterfly in which one buys one unit of the strangle and sells 2 units of the ATM option. Like the strangle, butterfly is also quoted in volatility. For example:

$$\text{delta butterfly} = 0.5(\text{implied Vol}(25 \text{ delta call}) + \text{implied Vol}(25 \text{ delta put})) - \text{ATM Vol}$$

The reason it is more common to quote the butterfly is that butterfly provides a strategy with almost no Vega but significant convexity. Since butterfly and strangle are related through the ATM volatility, which is always known, they may be used interchangeably. The 25 delta put and the 25 delta call can be determined based on the 25 delta RR and the 25 delta strangle.

Gearing, also referred to as leverage, is the difference in price between the exotic option with the barrier and a corresponding Vanilla option having the same strike. It should be noted that a Vanilla option is always more expensive than a corresponding exotic option.

Bid/offer spread is the difference between the bid price and the offer price of a financial derivative. In the case of options, the bid/offer spread is expressed either in terms of volatility or in terms of the price of the option. The bid/offer spread of a given option depends on the specific parameters of the option. In general, the more difficult it is to manage the risk of an option, the wider is the bid/offer spread for that option.

Typically traders try to calculate the price at which they would like to buy an option (i.e., the bid side) and the price at which they would like to sell the option (i.e., the offer side). Currently, there are no mathematical or computational methods for calculating bid/offer prices, and so traders typically rely on intuition, experiments involving changing the factors of an option to see how they affect the market price, and past experience, which is considered to be the most important tool of traders. Factors commonly relied upon by traders include convexity and RR which reflect intuition on how an option should be priced. One dilemma commonly faced by traders is how wide the bid/offer spread should be. Providing too wide a spread reduces the ability to compete in the options market and is considered unprofessional, yet too narrow a spread may result in losses to the trader. In determining what prices to provide, traders need to ensure that the bid/offer spread is appropriate. This is part of the pricing process, i.e., after the trader decides where to place the bid and offer prices, he/she needs to consider whether the resultant spread is appropriate. If the spread is not appropriate, the trader needs to change either or both of the bid and offer prices in order to show the appropriate spread.

SUMMARY OF THE INVENTION

The present invention provides a method and a system for calculating option prices (e.g., bid and offer prices) and for providing automatic trading capabilities, e.g., via global computer network. Specifically, the method of the present invention enables automatic calculation of the bid and offer prices of options with accuracy comparable to that of an experienced trader. Thus the invention also enables traders not only to correctly evaluate the price of the option, for example, the mid-market price of the option, but also to accurately determine the bid-offer spread of the option. Further, since the computation of the bid and offer prices in accordance with the invention does not involve amorphous factors and/or trader intervention, investors may transact on the options based on the automatically generated bid and offer prices. By feeding the model of the present invention with real time market data, the model generates real time market prices for derivatives and, therefore, the model automates the process of buying/selling derivatives.

In an embodiment of the present invention, the model is used in conjunction with an online trading system whereby on-line transactions are executed at the prices provided by the model. Liquidity providers, e.g., market makers and banks, may trade at the model prices instead of providing their own prices, i.e., they may sell options at the model generated offer price and buy at the model generated bid price avoiding any need for further calculations. Similarly, price-takers, e.g., hedgers, asset management groups, may execute deals automatically without prior automation of a bank on each transaction individually.

It is appreciated by persons skilled in the art that different types of asset markets are generally analogous in that they are controlled by analogous market conditions, e.g., forward rates, interest rates, stock dividends and costs of carry, and therefore, an option-pricing model which is suitable for one type of asset market is generally also adaptable to other types of markets, by appropriately interchanging the quantities used by the model with corresponding quantities of a different type of derivative. For example, to change the model from foreign exchange (FX) options to stock options, one would use the dividend rate of the stock in place of one of the interest rates used in the case of a pair of currencies.

Such adaptation is also possible in cases where the analogy is not simple, for example, in weather derivatives. To adapt the model of the invention to any type of option or option-like derivative, instead of simply replacing the quantities described below with corresponding quantities of a new type of derivative being computed, the model may be adapted by appropriately modifying its building blocks, which are described below, to accommodate the new type of derivative, and computing the price of the derivative based on the new building blocks. It should be appreciated that different option markets share similar basic principle. Thus, although the invention is described below in the context of the foreign exchange (FX) market, the model of the invention may be adapted to other option and option-like markets with appropriate changes, as will be apparent to those skilled in the art.

An embodiment of the present invention calculates bid and offer prices of an exotic option based on a corrected theoretical value (CTV) of the option and a bid/offer spread. The CTV may be computed based on a plurality of building blocks, as described below. For example, the CTV may be calculated based the theoretical value of the exotic option, a set of corrections, and a set of weights, each of which may be computed based on selection of the various details of the option including the spot, expiration date, class of the option (knock out, knock in, binary, European digital, etc.), strike (when applicable), barrier(s), forward rate to delivery, volatility for the expiration date, and interest rates of currencies. It is noted that a more complex exotic option may require additional details to define the option. A weight may be computed for each correction. Some or all of the weights may be time dependent. The corrected TV, also referred to herein as the adjusted mid-market price, may be computed as a function of the TV and the weighted corrections, or using any other suitable function of a plurality of building blocks that may reflect risks associated with the option.

To compute the bid/offer spread, a second set of weights may be computed corresponding to each correction, resulting in a different function of the building blocks, as described below. Some or all of the weights may be time dependent. The bid/offer spread may then be computed as a function of some base value and the weighted corrections, using the second set of respective weights. For example, the base value may be determined as the bid/offer spread of a Vanilla option corresponding to the subject exotic option. The weights applied to the corrections to determine the bid/offer spread are generally different from the weights applied to the corrections for the TV. In alternative embodiments of the invention, the bid/offer spread may be computing using any other suitable function of a plurality of building blocks that may reflect risks associated with the option.

Finally, in computing the bid and offer prices, the model may include computation of volatility smile adjustment, for example, using a look-up table representing volatility smile adjustment in a predefined range. Such a look-up table may be generated by computing the volatility for each strike value and for each delta value in a predefined set. An analogous system and method may be used to compute the bid and offer prices for Vanilla options in addition to exotic options and other complex derivatives.

In accordance with an embodiment of the invention there is thus provided a method for providing a bid price and/or an offer price of an option on an underlying asset, the method including receiving first input data corresponding to a plurality of parameters defining the option, receiving second input data corresponding to a plurality of current market conditions relating to the underlying asset, computing a plurality of building blocks based on the first and second input data, at least one of the building blocks being a function of a factor related to a risk associated with the option, computing a bid price and/or an offer price of the option as a function of at least some of the building blocks, and providing an output corresponding to the bid price and/or the offer price of the option. In some embodiments of the invention, computing the bid price and/or the offer price includes computing a corrected theoretical value (CTV) of the option as a first function of at least some of the building blocks, computing a bid/offer spread of the option as a second function of at least some of the building blocks, and computing the bid price and/or the offer price of the option based on the corrected TV and the bid/offer spread. The plurality of building blocks may include at least one building block selected from the group including convexity, risk reversal (RR), shift, gearing, Vega profile, and intrinsic value.

Further, in accordance with an embodiment of the invention, there is provided a method for providing a bid price and/or an offer price of an option on an underlying asset, the method including receiving first input data corresponding to a plurality of parameters defining the option, receiving second input data corresponding to a plurality of current market conditions relating to the underlying asset, computing a corrected theoretical value (CTV) of the option based on the first and second input data, computing a bid/offer spread of the option based on the first and second input data, computing a bid price and/or an offer price of the option based on the corrected TV and the bid/offer spread, and providing an output corresponding to the bid price and/or the offer price of the option.

Additionally, in accordance with an embodiment of the invention there is provided a system for providing a bid price and/or an offer price of an option on an underlying asset, the system including a server receiving first input data corresponding to a plurality of parameters defining the option and providing an output corresponding to a bid price and/or an offer price of the option, the server further receiving second input data corresponding to a plurality of current market conditions relating to the underlying asset, and a processor, associated with the server, which computes a plurality of building blocks based on the first and second input data, at least one of the building blocks being a function of at least one factor related to a risk associated with the option, and which further computes the bid price and/or the offer price of the option as a function of at least some of the building blocks. In some embodiments of the invention, in computing the bid price and/or offer price of the option, the processor computes a corrected theoretical value (CTV) of the option as a first function of at least some of the building blocks, a bid/offer spread of the option as a second function of at least some of the building blocks, wherein the processor computes the bid price and/or offer price of the option based on the corrected TV and the bid/offer spread. The plurality of building blocks may include at least one building block selected from the group including convexity, risk reversal (RR), shift, gearing, Vega profile, and intrinsic value.

Further, in accordance with an embodiment of the invention, there is provided a system for providing a bid price and/or an offer price of an option on an underlying asset, the system including a server receiving first input data corresponding to a plurality of parameters defining the option and providing an output corresponding to a bid price and/or an offer price of the option, the server further receiving second input data corresponding to a plurality of current market conditions relating to the underlying asset, and a processor, associated with the server, which computes, based on the first and second input data, a corrected theoretical value (CTV) of the option and a bid/offer spread of the option, and which further computes, based on the CTV and bid/offer spread, the bid price and/or the offer price of the option.

BRIEF DESCRIPTION OF THE DRAWINGS

The present invention will be understood and appreciated more fully from the following detailed description of a preferred embodiment of the invention, taken in conjunction with the accompanying drawings of which.

DETAILED DESCRIPTION OF A PREFERRED EMBODIMENT

A preferred embodiment of the present invention is described in the context of a model for calculating the market value (market price) of a foreign exchange (FX) exotic option. It should be appreciated, however, that models in accordance with the invention may be applied to other financial markets, and the invention is not limited to foreign exchange options or exotic options. One skilled in the art may apply the present invention to other options, e.g., stock options, or other option-like financial instruments, e.g., options on futures, or commodities, or non-asset instruments, such as options on weather, etc., with variation as may be necessary to adapt for factors unique to a given financial instrument.

In the embodiment described herein below, bid/offer prices are computed from a corrected theoretical value (TV) of an option and the bid/offer spread for that option. Computations for the corrected TV and bid/offer spread apply derivatives (partial derivatives up to second order) to factors readily available in the market. The factors include, for example, gearing (where the trigger is cancelled by setting it to zero, when the trigger is below the asset rate, or to infinity, when the trigger is above the asset rate) and the change in the profile of the Vega. Instead of trying to assess probabilities, the model presented herein enables assessment of the risk management cost of the option and of the compensation required by a trader in trading the option. In contrast to the Black-Scholes model, which is a probabilistic model, the approach of the present invention is based on determining what corrections must be added to the theoretical value of an option in order to compensate for the risk of the option in the trading book, e.g., the option portfolio run by the market maker. The key factors selected to achieve the goals of the models are referred to as building blocks.

The model of the present invention takes into account many factors that the Black-Scholes model ignores, e.g., factors that are related to transaction cost of re-hedging. For example, in the model described herein, the re-hedging cost of the Vega of the exotic option may be expressed in terms of the convexity cost of the option. By having a long convexity, i.e., a positive convexity in the trader book, a trader can earn money by selling volatility (e.g., selling ATM options) when the volatility is higher and buying volatility when it is lower, without taking a position. The shift of the trigger represents the probability of an option being near the trigger at a time close to the maturity of the option, at which point the re-hedging cost is the most expensive and, thus, the option is most risky.

Since the trader is typically delta hedged, at a knock-out event, the seller of a knock-out option should remove the delta hedge in a stop-loss trade, e.g., by buying back the underlying asset when the market rises or selling the underlying asset when the market declines. In-the-money knock out options are characterized by a growing delta discontinuity towards expiration of the option. As the time of maturity approaches, the delta re-hedging cost near the trigger may rise drastically, and the price of the option reflects the risk near the trigger. It should be noted that the shift of the trigger correction is always positive and thus needs to be properly gauged to express the risk. The gearing reflects some aspects of the time decay of the exotic option because the price of the option will converge to the price of the corresponding Vanilla option if it is not knocked out. Typically, the shorter the option, the more re-hedging is required to account for time decay.

In accordance with an embodiment of the present invention, two quantities are calculated separately, namely, the adjusted mid-market price and the bid/offer spread. According to this embodiment, separate calculations are used for computing the two quantities. The adjusted mid-market price is defined as the middle (i.e. the average) between the bid price and the offer price. As discussed above, the Black-Scholes model provides one price that may be referred to as theoretical mid-market price or theoretical value (TV). The adjusted mid-market price provided by the present invention may be regarded as an adjustment to the Black-Scholes price. Thus the adjusted mid-market price of the present invention may also be referred to as the corrected theoretical value (CTV). It should be appreciated that, since the final outputs of the model, typically provided to the user, are the bid and offer prices, as discussed below, the use of mid-market price as a reference point for the model of the invention merely for convenience and may be replaced by other arbitrary reference points, for example, a higher or lower value corresponding to some known function of to the mid-market price. The use of mid-market price as a reference for the computations is preferred simply because existing theoretical models for calculating prices of options, such as the Black Scholes model, are typically intended for calculating theoretical mid-market values.

The bid/offer spread, computed according to the preferred embodiment, reflects the risk that is related to re-hedging transaction costs entailed in the option. The building blocks used for corrections in the calculation of the bid/offer spread may be similar to those used to calculate the mid-market price because both the mid-market price and the bid/offer spread are related to the risk of the option. However, the building blocks are used with different relative weights in the two calculations. For example, in some cases terms may "cancel out" calculating the adjusted mid-market price, but, the same terms may have a cumulative effect in calculating the bid/offer spread as separate independent hedging costs that increase the spread.

Figure 1:
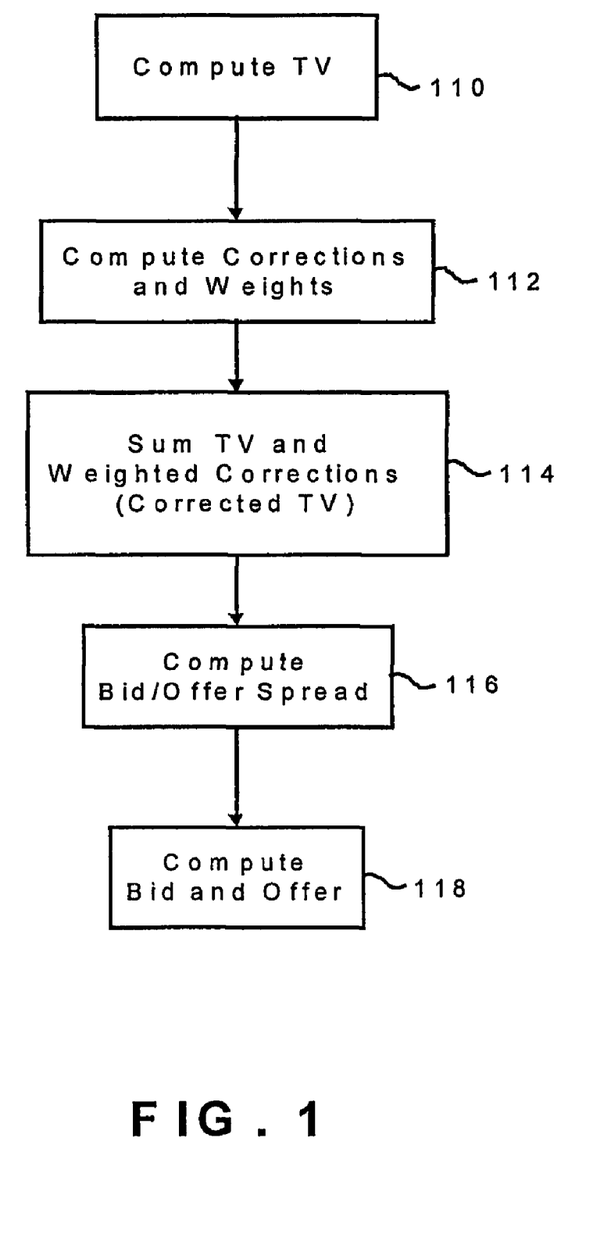
FIG. 1 is a flow chart illustrating an overview of a method for pricing options in accordance with an embodiment of the present invention.

By way of an overview of the preferred embodiment, referring to FIG. 1, at stage 110 the model calculates a theoretical value (TV) using a combination of known algorithms, e.g., based on the Black-Scholes model, or any model assuming that spot undergoes a Brownian motion pattern. This initial TV may be computed in an analytical method or using numerical calculations, as are known in the art. The Black-Scholes model is used in an exemplary embodiment because it is a common benchmark in the industry for pricing derivatives in cases where the underlying asset is assumed to follow a Brownian motion (a stochastic process). The inputs for the TV may include expiration date, class of the option, e.g., knock out, knock in, binary, European digital, etc., strike (when applicable), barrier(s), spot, forward rate to delivery, volatility for the expiration date, and interest rates of currencies. At stage 112, the model calculates corrections and weights to apply to the TV to generate the adjusted mid-market price, also referred to herein as corrected TV (CTV).

In this exemplary embodiment, the building blocks include convexity, risk reversal, intrinsic value, gearing, shift, and Vega. The corresponding corrections may then include convexity correction, risk reversal correction, intrinsic value correction, gearing correction, shift correction, and Vega correction, as described below. Weights are calculated for each correction where some of the weights may be time dependent. At stage 114, the corrections and corresponding weights are applied to the TV to generate the corrected TV. At stage 116, the model calculates the bid/offer spread by combining the some base value, e.g., the Vanilla bid/offer spread, and the various calculated corrections and weights, some of which weights may be time dependent, and which may be different from the weights used to compute the corrected TV. Finally, at stage 118, the bid and offer prices are computed from the corrected TV and the bid/offer spread provided by the model. The preferred embodiment is demonstrated as applied to in-the-money barrier options, by way of example. It should be appreciated that, with appropriate changes, the invention may be applied to any other type of option or option-like financial derivative known in the art.

Figure 2A:
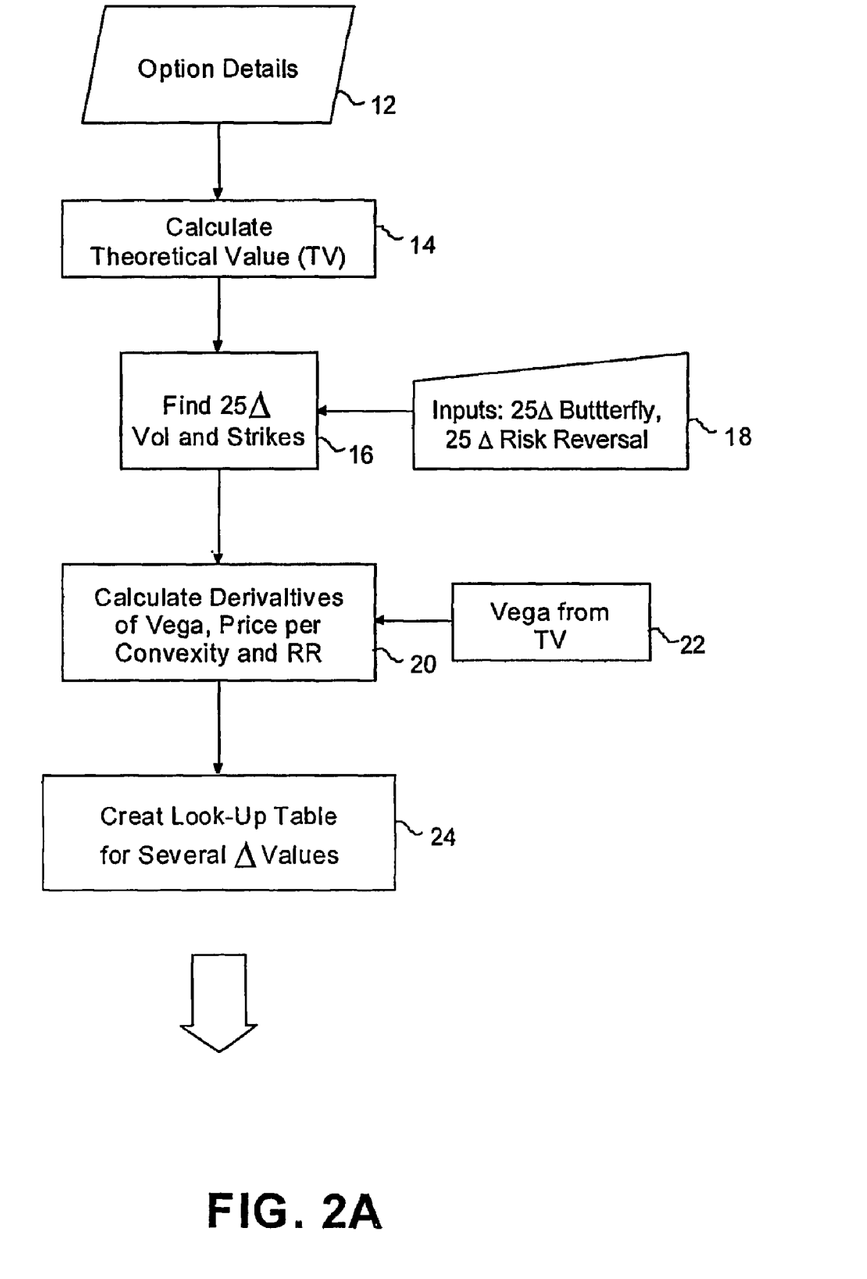
FIGS. 2A-2D are sequential flow charts schematically illustrating an algorithm for calculating bid/offer prices of foreign exchange (FX) options in accordance with an embodiment of the present invention.

Reference is made to FIGS. 2A-2D, taken sequentially, which schematically illustrate a method for computing adjusted mid-market price and bid/offer spread, and bid and offer prices of a foreign exchange (FX) option, in accordance with an embodiment of the invention. As shown in FIG. 2A, the inputs for the calculation indicated at block 12 preferably include many significant details of the subject option or the relevant market. Option details include information derived from the relevant market, referred to herein as market conditions, as well as details defining the option, referred to herein as parameters, which may be specified by the user. Market conditions include market information that describes or relates to the subject option, as well as market information not specific to the subject option. Examples of market conditions include spot, volatility, forward rate, and interest rates. Parameters include, for example, strike, trigger value(s), and expiration date(s). The parameters may also include an identification of the type of option, an identification of the underlying asset, e.g., the currencies being exchanged, and other information defining the option. For example, to compute the price of a window knock-out option, the option details may also include the date on which the trigger is activated and the date on which the trigger is deactivated. Values for market conditions, e.g., the current interest rates, forward rates, and the ATM volatility, may be obtained from information available in the market, as is known in the art. The market information is based on assets that are continuously traded in the market and their prices are available in different forms. For example, the inputs may be based on information taken from screens of market data provided by companies such as REUTERS, Bloomberg, Telerate, etc., and/or directly from brokers, e.g., over the telephone.

Block 14 indicates the computation of the theoretical value (TV) of the option being priced. The algorithm for computing the TV may be based on Black-Scholes or similar models consisting of analytic formulas as are known in the art. In some cases, for example, when computing double knock-out options, the computation may involve summing over infinite series; however, due to the fast convergence of such infinite series, it is generally sufficient to sum the first ten elements of such series. For example, a double knock-out option, which is similar to knock-out option but has two barriers (one above the current spot level and one below), involves summing over an infinite series, but yields acceptable results when only the first ten elements of the series or less are summed.

Continuing reference to FIG. 2A, block 16 indicates the calculation of the strikes and volatility (denoted "Vol") of 25 delta call and put, respectively, i.e. the strikes for which the delta for the given volatility is 25 percent. The implied volatility of the 25 delta call and put may be derived directly from the 25 delta RR and 25 delta butterfly (strangle). Block 18 indicated the input of these two values that may be obtained from the market conditions. As mentioned in the background section above, the 25 delta RR and 25 delta strangle (butterfly) are commodities in the options market and quotes for those inputs are readily available from well known online sources, as is the case for the ATM volatility.

Block 20 indicates the calculation of derivatives of Vega including the convexity of the 25 delta strangle, the slope of Vega over spot of the 25 delta risk reversal, as well as the price per convexity and price per risk reversal. These quantities may be used to gauge the corresponding derivatives of the exotic option. By comparing the premium (i.e., the price) of the 25 delta strangle to the premium of the 25 delta strangle with ATM volatility, the model may compute the price of a unit of convexity, denoted "Price(convexity)". By comparing the price being paid for 25 delta RR versus ATM, the model may calculate the price of one unit of dVega/dSpot, also denoted "Price(RR)". At this stage of the computation, all the relevant values for 25 delta are computed. Next, the strikes and volatility values for other values of delta, within a preset range, may be computed. Block 22 indicates the calculation of Vega from the TV used in the computation indicated by block 20.

As indicated at block 24, the strikes and volatility for each delta are computed and may be arranged in memory, e.g., in the form of a look-up table, for reference later in the computation. The table generated indicates the relationship between the strike and volatility so that the volatility for a given strike may be looked up in the table. The algorithm for generating this look-up table, also referred to as volatility smile adjustment, is described in detail below, following the description of computing the bid and offer prices. The novel volatility smile adjustment mechanism in accordance with the present invention is not limited to computation of exotic options, as described herein; rather, this novel mechanism has a general applicability and may also be used independently for obtaining the mid-market price of Vanilla options.

Figure 2B:
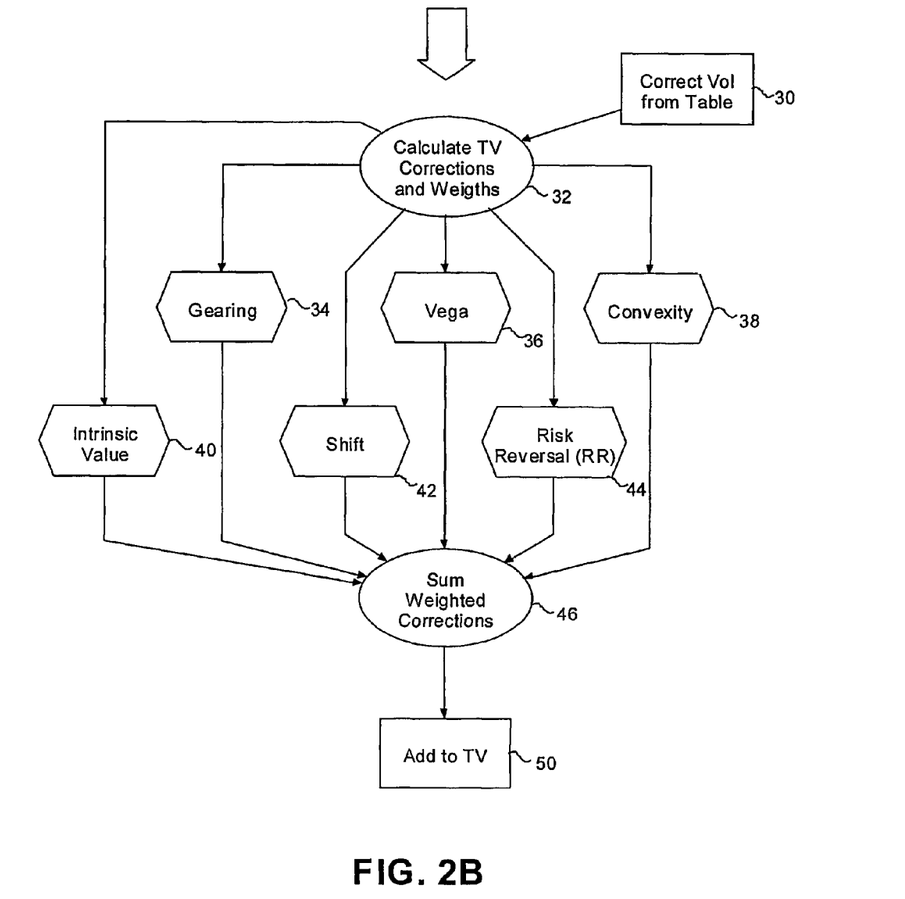

Referring now to FIG. 2B, the corrections and weights are calculated for the particular option, as indicated at block 32. The corrections are denoted, respectively, as follows: convexity correction at block 38; risk reversal correction at block 44; intrinsic value correction at block 40; gearing correction at block 34; shift correction at block 42; and Vega correction at block 36. It should be noted by one skilled in the art that additional corrections may be used in the computation of the corrected TV and bid/offer spread, and similarly not all of the corrections listed herein need be used to produce valuable results for a particular option. The corrections used in the exemplary embodiment described herein may be defined as follows:

(a) Convexity correction=convexity*Price(Convexity)
(b) Risk reversal correction=(dVega/dSpot)*rice(RR)
(c) Intrinsic value correction=intrinsic value
(d) Gearing correction=gearing/Ratio(TV(exotic)/TV(Vanilla))
(e) Shift correction=a function of the change in the TV when the barrier is shifted and the change in TV when the expiration is shifted.
(f) Vega correction=Smile(Kmin)*Ratio(Vega (Smin)/Vega (Kmin))

In this embodiment, there is a building block corresponding to each correction indicated by blocks 34-44. The building blocks and other values needed to compute the corrections are based on the values determined at blocks 16-24 of FIG. 2A, using option parameters and market conditions. Convexity is defined as dVega/dVol. Price(Convexity) is the average Vega of the 25 delta call and put Vanilla options multiplied by the butterfly and divided by the dVega/dVol of the 25 delta strangle. Risk Reversal is defined as dVega/dSpot. Price(RR) is the average Vega of the 25 delta call and put Vanilla options multiplied by the RR and divided by dVega/dSpot of the 25 delta Risk Reversal. Intrinsic value is the distance between a given trigger value and the strike, normalized by the trigger value. Gearing is the difference in price between the exotic option with the given trigger and a corresponding Vanilla option with the same strike. TV(exotic) is the theoretical value of the original exotic option as calculated by the Black-Scholes model. TV(Vanilla) is the theoretical value of the corresponding Vanilla option, i.e. the option with the same parameters except for the triggers. Ratio(TV(exotic)/TV(Vanilla)) is the ratio between TV(exotic) and TV(Vanilla) subject to a cut-off when the ratio exceeds a predetermined value, for example, a value between 6 and 12.

The gearing correction is proportional to the difference and ratio between the theoretical values of the exotic option and a Vanilla option with the same parameters. For each exotic option with a strike, there is a corresponding Vanilla option. For example, a knock-out option has a trigger or barrier. A Vanilla option corresponding to this exotic option will have the same maturity time, spot, strike, etc. but no barrier. Since adding a knock out barrier limits the validity of the option, e.g., it is possible that the exotic option knocks out (i.e., terminates) while the corresponding Vanilla option ends up in the money, the exotic option would generally be less expensive than the corresponding Vanilla option. The gearing correction depends on the ratio and difference between the TV of the Vanilla option and the is TV of the exotic option.

The shift correction is a function of two values: the change in TV when the trigger is shifted, and the change in TV when the expiration is shifted. The shift correction function may be, for example, the maximum of these two values. Alternatively the function may be the sum of these two values. The first value may be computed by shifting the trigger so that the intrinsic value is increased by a certain percentage, e.g., 5 percent, and determining the resultant change in the TV. The second value may be computed by shifting the expiration by, for example, one day, and determining the change in TV. The shift correction is a measure of the sensitivity of the theoretical value (TV) of the option price to changes in the trigger value and expiration.

The Vega correction requires characterizing the profile of the Vega with respect to the spot. Such characterization may involve, for example, the following factors: Vega (Smin); Vega (Kmin); and Smile(Kmin). Vega (Smin) is the Vega of the barrier option at a spot, Smin, which produces the minimum value of Vega. In other words, Smin is the minimum of the Vega of the exotic option with respect to the spot. Vega (Kmin) is the Vega of the Vanilla option with strike, Kmin. Smile(Kmin) is the smile adjustment, i.e., the adjustment of the price of a Vanilla option, with a strike Kmin. Kmin may be computed using the following equation:

$$Smin = Kmin * (\text{current Forward rate})/(\text{current spot rate})$$

Thus, Kmin is the strike that yields a forward rate of Smin at current interest rates.

The volatility of the option may be determined by finding, in the look-up table, denoted by block 30, the volatility for the computed strike, i.e. Kmin. It should be appreciated by persons skilled in the art that characterization of the Vega profile with respect to the spot may also be performed using other suitable parameters, for example, in certain cases, instead of using one strike value (e.g., Kmin), as described above, more than one strike value may be used to approximate the Vega profile.

Once the above-described corrections are computed, they are added to the TV, either directly or with some restrictions, using time dependent weights as described in detail below, producing the total corrected TV. The weights of the corrections generally reflect the risk involved in each correction. For example, some of the corrections, e.g., the gearing correction, have an enhanced influence close to the maturity of the option, but very small influence when the option is far from maturity. Other corrections, e.g., the convexity correction, have less of an influence close to the maturity. Therefore the weights are generally tailored to adjust for the specific risk versus time-to-maturity behavior of each of the corrections.

The motivation for adding weighted corrections to the TV, in accordance with the invention, is partly based on the realization by the inventors that models such as the Black-Scholes model underestimate the probability of reaching a far spot level when time to maturity is long. In reality, the probability for a far knock out is generally higher than that anticipated by the Black-Scholes formula. This is part of the reason for the decay of most of the factors with time to maturity beyond a certain level. This type of adjustment may be particularly valuable when calculating prices of "one touch" options, i.e., options where the buyer receives a certain payout if the spot touches the barrier, For the class of in-the-money knock out options, the weights used for the computation of the corrected TV, wherein Ca denotes the time-dependent weight for correction (a), Cb denotes the time-dependent weight for correction (b), etc., are as follows:

$$Ca = \exp(-0.5)*\exp(-t/(2\pi))*\sqrt{t}*P\text{touch}(t/2)$$

$$Cb = (4/\pi^2)*P\text{touch}(t)$$

$$Cc = 10$$

$$Cd = 0.48*\exp(-2t/\pi)$$

$$Ce = \exp(-0.5)*\exp(-t)$$

$$Cf = (3/4)^2$$

wherein Ptouch(t) is the probability of touching the trigger prior to time t.

As indicated at blocks 46 and 50, following the computation of the corrections and weights for a given option, the corrected TV (CTV), i.e., the adjusted mid-market price, may be computed as follows:

$$CTV = TV + Ca*a + Cb*b + Cc*c + Cd*d + Ce*e + Cf*f$$

wherein TV is the theoretical value; a, b, c, d, e, and f are the corrections; and Ca, Cb, Cc, Cd, Ce, and Cf are the respective weights.

Figure 2C:
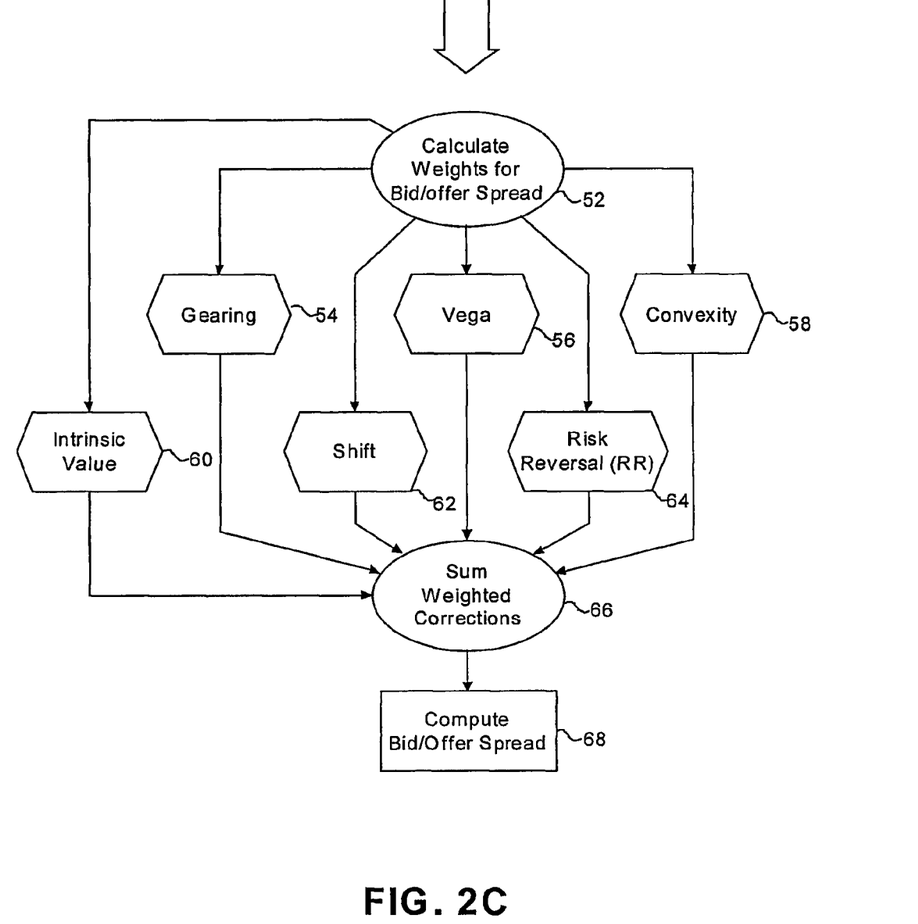

Referring now to FIG. 2C, the bid/offer spread may be computed based on the same set of corrections along with a different set of weights, some of which may be time dependent. These new weights may be functions of the underlying corrections. Using the newly calculated weights, the corrections are summed, yielding the bid-offer spread. Block 52 indicates computing the new weights, blocks 54-64 indicate the corrections for computing the sum, block 66 indicates summing of the weighted corrections, and block 68 indicated computing the bid/offer spread.

The bid/offer spread of the exotic option may depend also on the bid/offer spread of the corresponding Vanilla option in the current market conditions. The spread of an exotic option per Vega is generally wider than that of the corresponding Vanilla, for example, by a factor of about 1.5*(Vega of the exotic)/(Vega of the ATM Vanilla), or higher. Therefore, the bid/offer spread of the ATM Vanilla option may be used as a base value in the bid/offer spread computation of the preferred embodiment. It should be appreciated, however, that other suitable factors may be used in addition to or instead of the Vanilla bid/offer spread in formulating the base value for the bid/offer spread calculation in accordance with the invention. The remaining factors may be the same as those used for computing the corrected TV, as described below, or different building blocks may be used for the bid/offer spread computation, based on the principles discussed above, to adapt for particular option types. The corrections, as applied to the computation of the bid/offer spread, are indicated in FIG. 2C as follows: convexity correction at block 58; risk reversal correction at block 64; intrinsic value correction at block 60; gearing correction at block 54; shift correction at block 62; and Vega correction at block 56.

Since the bid/offer spread is related to the risk/transaction cost of re-hedging, the corrections have similar properties as those used for the adjusted mid-market price. However the different corrections are added in the bid/offer spread calculation with absolute values because the transaction costs involved in re-hedging the different parameters are generally independent. For example, an option may have a positive convexity, which lowers the price, and a negative risk reversal, which raises the price, causing an over-all small change in the CTV. However, hedging the convexity is independent of hedging the risk reversal and, therefore, these two corrections result in a wider bid/offer spread. The weights applied to the corrections are denoted Sa, Sb, Sc, Sd, Se, and Sf, respectively. These weights are calculated as follows:

$$Sa = 0.8*\exp(-2t)$$

$$Sb = 0.5*\exp(-t)$$

$$Sc = 2$$

$$Sd = 2.5*\exp(-\pi t)$$

$$Se = \exp(-2t/\pi)$$

$$Sf = 0.1$$

The formula for the bid/offer spread follows (abs denotes absolute value):

$$\begin{aligned}\text{Bid/offer spread} = &\,1.5*\text{Vega of the exotic}*\text{VanillaATM\_Bid/Offer spread (in Vols)}\\&+ \text{abs}(Sa*a) + \text{abs}(Sb*b) + \text{abs}(Sc*c) + \text{abs}(Sd*d)\\&+ \text{abs}(Se*e) + \text{abs}(Sf*f)\end{aligned}$$

Figure 2D:
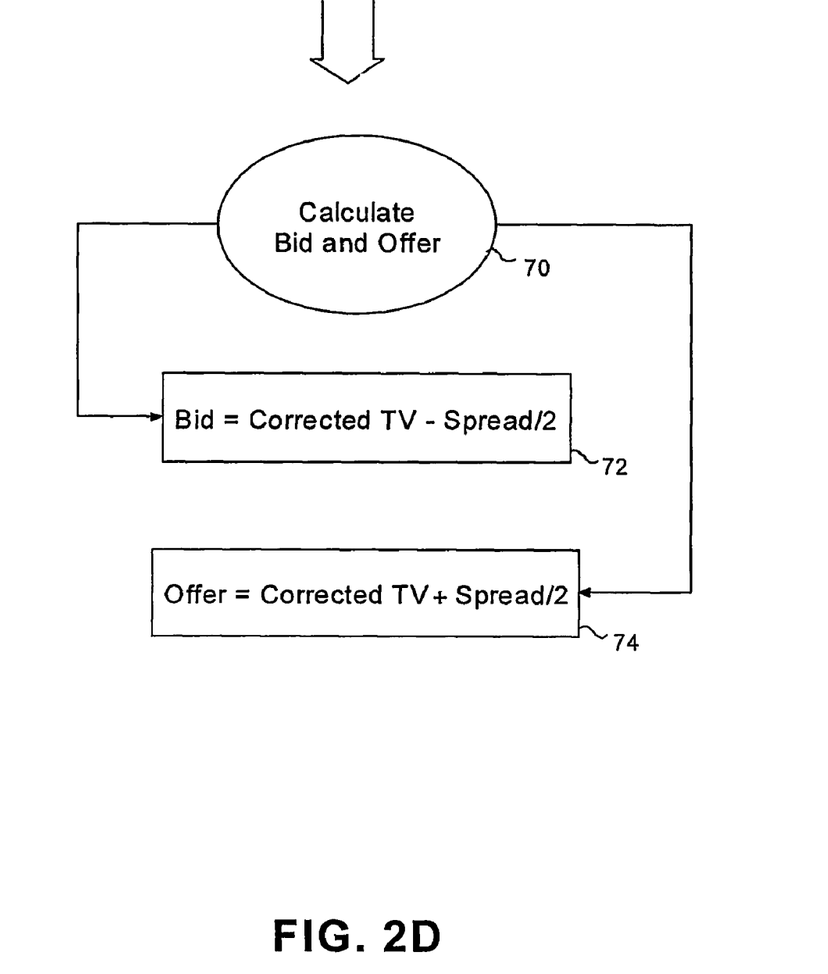

Reference is now made to FIG. 2D. After computing the bid/offer spread, the bid and the offer prices are computed, as indicated at block 70, by subtracting and adding, respectively, one half (0.5) of the bid/offer spread to the average price calculated. Hence, as denoted at block 72, the bid is the adjusted mid-market price (CTV) minus half the spread, and the offer is the adjusted mid-market price (CTV) plus half the spread, as indicated at block 74.

As discussed above with reference to calculating the smile adjustment for Vanilla options and the generation of the look-up table at block 24 (FIG. 2A), the algorithm for computation of the volatility smile adjustment for Vanilla options has general applicability, as is demonstrated below in the context of calculating the bid/offer spread for the Vanilla option. Therefore, the present invention also includes a method for pricing Vanilla options for any given strike. The volatility smile adjustment is calculated from the volatility of an At-The-Money (ATM) Vanilla option and 25 Delta call and put options. The factors used in calculating the volatility smile include Vega, dVega/dSpot (i.e., risk reversal), and dVega/dVol (i.e., convexity). Vega is the partial derivative of the option value (price) with respect to the volatility. dVega/dSpot is the partial derivative of the Vega with respect to the spot, and dVega/dVol is the partial derivative of the Vega with respect to the volatility.

Two additional factors, derived from market conditions, used in calculating the volatility smile adjustment include 25 delta butterfly and 25 delta Risk Reversal, both measured in units of volatility. As discussed above, these factors are defined or calculated as follows:

$$25 \text{ delta butterfly} = 0.5 * (\text{implied Vol}(25 \text{ delta call}) + \text{implied Vol}(25 \text{ delta put})) - \text{ATM Vol}.$$

$$25 \text{ delta risk reversal} = \text{implied Vol}(25 \text{ delta call}) - \text{implied Vol}(25 \text{ delta put})$$

The volatilities of the 25 delta options may be calculated from these two factors. Using multiple iterations, the entire volatility smile may be calculated, e.g., a look-up-table may be constructed linking strikes to corresponding deltas and volatility values. Hence, starting with the volatility of an at-the-money option, which is known, volatilities for the option at various different deltas (i.e., not only ATM) may be computed using the 25 delta butterfly and 25 delta risk reversal. Each set of strike-volatility-delta is unique and may be included in the look-up-table for easy reference later in the algorithm.

Thus, the smile adjustment for Vanilla options may be computed starting with the following inputs: 25 delta risk reversal; 25 delta strangles (butterfly); ATM volatility; spot; forward rate; and interest rates. The algorithm for calculating the smile adjustment may be as follow:

1. For a given delta, D1, find the strikes of the D1 delta strangle. If D1 is less than a predetermined value, e.g., 30, use the 25 delta implied volatility, obtained from the RR and the strangles; otherwise use the ATM implied volatility.
2. Calculate the following: dVega/dVol of the D1 strangle*Price(convexity) and dVega/dSpot of D1 (RR) *Price(RR); wherein Price(convexity) and Price(RR) are calculated from the 25 delta strangle and 25 delta RR, as discussed above.
3. Calculate a desired premium for D1 strangle over its premium with ATM volatility, by requiring the same price for one unit of convexity as the price for one unit of 25 delta strangle. Repeat this calculation for the dVega/dSpot.
4. Adjust the implied volatility of the D1 strikes to fulfill the same price for a unit of convexity as for the 25 delta butterfly, and the same for a unit of dVega/dSpot as for the 25 delta risk reversal.
5. Calculate new strikes corresponding to delta D1 with the volatility in step 4.
6. Repeat steps 3-5 sequentially until convergence is achieved.
7. Set the last volatility obtained as the implied volatility for D1 strikes.
8. Repeat steps 1-7 for other deltas to create a look-up-table of strikes and their implied volatility.
9. For strikes positioned between those in the look-up-table, use interpolation based on the values of the look-up-table. It should be noted that the smile adjustment for a given strike is independent of whether the option is a call option or a put option.

The computation presented above for the bid/offer spread has general applicability as is demonstrated by the following algorithm for computing the bid/offer spread for Vanilla options. The input for this computation may include the bid/offer spread of the ATM volatility, as is known in the art. The market data input may include both bid and offer ATM volatilities. The algorithm for computing the bid/offer spread may be as follows:

1. Calculate the bid/offer spread of the ATM option in basis points ("bp"), i.e., in units corresponding to $\frac{1}{100}$ of a percent of the quantity being traded. This may also be approximated using the following formula:

$$\text{SpreadATM} = \text{Vega}(\text{ATM}) * (\text{bid/offer spread of volatility}).$$

2. Calculate the smile adjusted volatility for a given strike, K. Calculate the delta that corresponds to strike K, denoted delta (K), by taking the call if the strike is above the forward rate and take the put if the strike is below the forward rate.
3. Calculate the bid offer spread for strike K in basis points (bp), as follows:

$$\text{Spread}(K) = \max[2bp, \exp(-\text{abs}(\text{delta}(K) - \text{delta}(\text{ATM}))/(3*100*pi))*\text{Spread}(\text{ATM})]$$

4. Calculate the bid price and offer price as follows:

$$\text{Bid-Price}(K) = \max(\text{Price}(K) - 0.5 * \text{Spread}(K), \min(\text{Price}(K), 1bp))$$

$$\text{Offer-Price}(K) = \text{Bid-Price}(K) + \text{Spread}(K)$$

wherein Price(K) denotes the middle price in basis points (bp) of the option being priced.

5. Find Volatility-Bid and Volatility-Offer that correspond to Bid-Price(K) and Offer-Price(K). These volatilities are the bid and offer volatilities.

Figure 3:
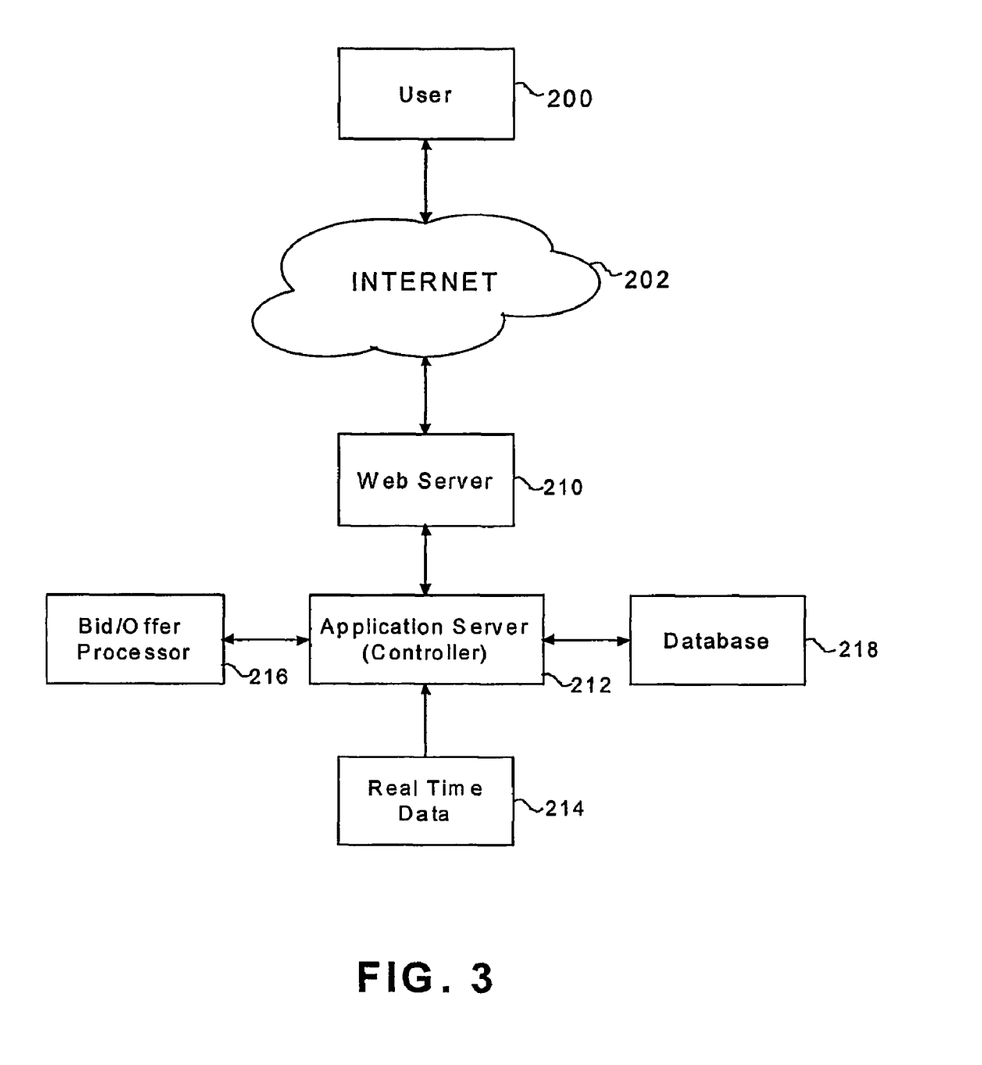
FIG. 3 is a schematic block diagram illustrating a system for pricing options in accordance with an embodiment of the present invention.

Reference is now made to FIG. 3, which schematically illustrates a system for pricing financial derivatives in accordance with an embodiment of the invention. As described in detail above, the system includes a database 218 for storing information received from a user 200, including details of an option to be priced, as well as real time data 214, such as market conditions from sources as are known in the art. Market conditions may include, for example, a current spot price for the underlying asset (or other value) subject of the option. The information received from the user and the real time market conditions are processed by an application server 212, which may include any combination of hardware and/or software known in the art for processing and handling information received from various sources. Application server 212 is preferably associated with a controller, as is known in the art, which controls and synchronizes the operation of different parts of the system. Application server 212 is associated with Bid/Offer processor 216 which executes the method described above with reference to FIGS. 2A-2D. The Bid/Offer processor may include any combination of hardware and/or software known in the art capable of executing the algorithms described above with reference to FIGS. 2A-2D.

The information from user 200 is preferably received by a web server 210, as is known in the art, which is adapted to communicate with a global communication network 202, e.g., the Internet, via a communication modem, as is known in the art. The user may communicate with web server 210 via the Internet 202 using a personal computer, or any other suitable user interface having a communication modem for establishing connection with the Internet 202, as is known in the art. In other embodiments of the invention, user 200 may communicate with web server 202 directly, for example, using a direct telephone connection or a secure socket layer (SSL) connection, as is known in the art. In an alternative embodiment of the invention, user 200 is connected directly to application server 212, for example, via a local area network (LAN), or via any other local communication network known in the art.

The real time data 214 may be received directly by application server 212 using any direct connection means as are known in the art. Alternatively, the real time data may be received from sources available on the global computer communication network, using web server 210. After computing a bid price and an offer price for the option requested by the user, application server 212 may communicate the computed bid/offer prices to user 200 via web-server 210, as is known in the art, in a format convenient for presentation to the user.

Table 1 below shows three examples demonstrating application of a preferred embodiment of the invention, as described above with reference to FIGS. 2A-2D. These examples are based on information taken from foreign exchange exotic option brokers on three different dates. The dates appear on the trade date row of the table. The brokers provide the maturity date of the option from which the number of days to maturity is measured. The remaining inputs include the details of the option, for example, option parameters such as strike, put or call, barrier, as well as market conditions relevant to the trade, e.g., spot, forward, ATM volatility, 25 delta RR, 25 delta butterfly, current interest rates, the TV of the exotic option, and the TV of the corresponding Vanilla option. Actual bid and offer prices for Table 1 are taken from a number of market makers (brokers). The "fair price" entries in Table 1 represent the average of the bid/offer prices presented by the different market makers. The fair market price represents the market price of the option. Finally, the bid and offer prices calculated in accordance with a preferred embodiment of the invention are presented at the bottom of the table, denoted "model price". These prices are generated from the adjusted mid-market prices and the bid/offer spreads as described above. It is evident from Table 1 that the model of the present invention provides a correct bid/offer spread and a correct adjusted mid-market price for the exemplary options computed. It is also evident from Table 1 that the TV calculated based on the Black-Scholes model does not yield correct results.

Referring to Example 1 in Table 1, the option traded on Feb. 12, 1999, has an expiration date of Jun. 14, 1999, i.e., 122 days after trading. Table 1 also presents additional details of the option as discussed above. For example, the spot price for the underlying asset of the option of Example 1 is 114.40, the volatility for this option is 17.35, the forward for this option is −1.86, the theoretical value (TV) calculated based on the Black-Scholes model is 0.38, and the corresponding Vanilla option price and bid/offer spread are 2.7 and 0.25, respectively. Table 1 also presents bid and offer prices for the option of Example 1, provided by 6 different market makers, which may be averaged to yield "fair" bid and offer prices of 0.38 and 0.64, respectively. As further shown in Table 1, the bid and offer "model" prices for the option of Example 1 are 0.38 and 0.64, respectively, which values are identical to the "fair" bid and offer prices, respectively. From analyzing Table 1, one skilled in the art will conclude that the results obtained from the model of the present invention for the option of Example 1 are remarkably close (essentially identical) to the average fair prices of the same option. Similarly, from analyzing the data of Examples 2 and 3 in Table 1, one skilled in the art will appreciate that the "model prices" computed in accordance with the invention for the options of Examples 2 and 3 are substantially identical to the average "fair prices" of these options.

TABLE 1

|  | Example 1 | | Example 2 | | Example 3 | |
| --- | --- | --- | --- | --- | --- | --- |
| Interest Rate 1 | 6.19% | | 3.10% | | 6.09% | |
| Interest Rate 2 | 0.19% | | 6.18% | | 0.17% | |
| Currency 1 | U.S dollar | | Eur | | U.S. dollar | |
| Currency 2 | Japan yen | | U.S. dollar | | Japan yen | |
| Trade Date | 12 Feb. 1999 | | 18 Jan. 2000 | | 15 Jun. 1999 | |
| Expiration Date | 14 Jun. 1999 | | 16 Nov. 2000 | | 15 Dec. 1999 | |
| Months to Expiration | 4 | | 10 | | 6 | |
| Days to Expiration | 122 | | 303 | | 183 | |
| Spot | 114.40 | | 1.01 | | 120.35 | |
| Volatility | 17.35 | | 10.75 | | 12.5 | |
| Forward | −1.86 | | 0.006 | | −3.15 | |
| Strike | 116.00 | | 1.00 | | 115.00 | |
| Put/Call | Call | | Call | | Put | |
| Barrier (trigger) | 126.00 | | 1.10 | | 100.00 | |
| 25 Delta Risk Reversal | −0.375 | | −0.4 | | 0.1 | |
| 25 Delta Butterfly | 0.75 | | 0.25 | | 0.55 | |
| Class | RKO | | RKO | | RKO | |
| TV (exotic) | 0.38 | | 0.655 | | 1.64 | |
| TV (Vanilla) | 2.7 | | 5.47 | | 2.565 | |
| Vanilla Bid/Offer spread (Vol) | 0.25 | | 0.25 | | 0.25 | |
| Number of prices | 6 | | 5 | | 5 | |
| 6 market makers | Bid | Offer | Bid | Offer | Bid | Offer |
| 1 | 0.38 | 0.70 | 73 | 99 | 129 | 154 |
| 2 | 0.38 | 0.65 | 75 | 91 | 124 | 151.5 |
| 3 | 0.36 | 0.66 | 75 | 95 | 122 | 152 |
| 4 | 0.38 | 0.58 | 73 | 98 | 120 | 150 |
| 5 | 0.40 | 0.60 | 76 | 89 | 125 | 150 |
| 6 | 0.39 | 0.64 | | | | |

TABLE 1-continued

|  | Example 1 | | Example 2 | | Example 3 | |
| --- | --- | --- | --- | --- | --- | --- |
| Fair Price (Bid/Offer) | 0.38 | 0.64 | .75 | .94 | 1.24 | 1.51 |
| Model Price (Bid/Offer) | 0.38 | 0.64 | .75 | .94 | 1.24 | 1.51 |

While the embodiments of the invention shown and described herein are fully capable of achieving the results desired, it is to be understood that these embodiments have been shown and described for purposes of illustration only and not for purposes of limitation. Other variations in the form and details that occur to those skilled in the art and that are within the spirit and scope of the invention are not specifically addressed. Therefore, the invention is limited only by the appended claims.

The invention claimed is:

1. A computer-based method comprising:
receiving by a computing device first input data corresponding to at least one parameter defining an option on an underlying asset and second input data corresponding to at least one current market condition relating to the underlying asset, wherein said first input data comprises an indication of at least one of a type of said option, an expiration date of said option, a trigger for said option, and a strike of said option;
automatically computing by the computing device a bid/offer spread of the option based on the first input data and the second input data; and
automatically computing, by the computing device, at least one of a bid price and an offer price of said option based on said bid/offer spread.

2. A method according to claim 1, wherein said second input data comprises an indication of at least one of a spot value, an interest rate, a volatility, an at-the-money volatility, a 25 delta risk reversal, a 25 delta butterfly, and a 25 delta strangle.

3. A method according to claim 1 comprising automatically outputting from the computing device an output corresponding to at least one of the bid price and the offer price of said option.

4. A method according to claim 1, wherein the second data includes real-time second data, and wherein computing said bid/offer spread comprises automatically computing said bid/offer spread in real-time based on the real-time second data.

5. A method according to claim 1, wherein computing said bid/offer spread comprises computing said bid/offer spread based on a corrected-theoretical-value of said option.

6. A method according to claim 1, wherein computing said bid/offer spread comprises: computing a base value for the bid/offer spread using at least part of said first and second input data; and computing said bid/offer spread by correcting said base value using at least part of said first and second data.

7. A method according to claim 6, wherein correcting said base value comprises: computing a plurality of bid/offer spread corrections based on at least part of said first and second input data; and applying said plurality of bid/offer spread corrections to said base value.

8. A method according to claim 7 wherein at least one of said plurality of bid/offer spread corrections is a function of at least one factor related to a risk involved in said option.

9. A method according to claim 8, wherein said plurality of bid/offer spread corrections comprise at least one of a convexity correction, a risk reversal correction, a shift correction, a gearing correction, a Vega correction, and an intrinsic value correction.

10. A method according to claim 7, wherein applying said bid/offer spread corrections to said base value comprises:
computing a bid/offer spread correction weight corresponding to one or more of said bid/offer spread corrections;
multiplying said one or more bid/offer spread corrections by the corresponding bid/offer spread correction weight yielding weighted bid/offer spread corrections; and
adding said weighted bid/offer spread corrections to said base value.

11. A method according to claim 10 wherein at least one of said bid/offer spread correction weights is time dependent.

12. A method according to claim 1, wherein said underlying asset comprises a financial asset.

13. A method according to claim 12 wherein said option is a foreign exchange (FX) option, a Vanilla option; an option-like financial derivative, or an exotic option.

14. A system comprising:
a server to receive first input data corresponding to at least one parameter defining an option on an underlying asset and second input data corresponding to at least one current market condition relating to said underlying asset, wherein said first input data comprises an indication of at least one of a type of said option, an expiration date of said option, and a trigger for said option; and
a processor associated with said server, which computes a bid/offer spread of said option based on said first and second input data, and computes at least one of a bid price and an offer price of said option based on said bid/offer spread.

15. A system according to claim 14, wherein said second data comprises an indication of at least one of a spot value, an interest rate, a volatility, an at the money volatility, a 25 delta risk reversal, a 25 delta butterfly, and a 25 delta strangle.

16. A system according to claim 14, wherein said server is to provide an output corresponding to at least one of the bid price and the offer price of said option.

17. A system according to claim 14, wherein said processor is to compute said bid/offer spread based on a corrected-theoretical-value of said option.

18. A system according to claim 14 wherein, in computing said bid/offer spread, said processor computes a base value for the bid/offer spread and computes said bid/offer spread by correcting said base value, based on at least part of said first and second data.

19. A system according to claim 18 wherein, in correcting said base value, said processor computes a plurality of bid/offer spread corrections and applies said plurality of bid/offer spread corrections to said base value.

20. A system according to claim 19 wherein at least one of said bid/offer spread corrections is a function of at least one factor related to a risk associated with said option.

21. A system according to claim 20, wherein said plurality of bid/offer spread corrections comprise at least one of a convexity correction, a risk reversal correction, a shift correction, a gearing correction, a Vega correction, and an intrinsic value correction.

22. A system according to claim 19 wherein, in applying said bid/offer spread corrections to said base value, said processor computes a plurality of bid/offer spread correction weights for said plurality of bid/offer spread corrections, multiplies said plurality of bid/offer spread corrections by said plurality of bid/offer spread correction weights to yield a corresponding weighted bid/offer spread correction, and adds said weighted bid/offer spread corrections to said base value.

23. A system according to claim 22 wherein at least one of said bid/offer spread correction weights is time dependent.

24. A system according to claim 14, wherein said underlying asset comprises a financial asset.

25. A system according to claim 24, wherein said option is a foreign exchange (FX) option, a Vanilla option, an option-like financial derivative, or an exotic option.

26. A method according to claim 1 comprising receiving said second input data via a communication network.

27. A method according to claim 1 comprising communicating at least one of the bid price and the offer price of said option via a communication network.

28. A method according to claim 1, wherein said underlying asset is related to at least one of a commodity, a stock, a bond, an interest rate, and the weather.

29. A system according to claim 14, wherein said server is to receive said second input data via a communication network.

30. A system according to claim 14, wherein said server is to communicate at least one of the bid price and offer price of said option via a communication network.

31. A system according to claim 14, wherein said underlying asset is related to at least one of a commodity, a stock, a bond, an interest rate, and the weather.

32. A non-transitory machine-readable medium having stored thereon instructions, which when executed by a machine result in:
receiving first input data corresponding to at least one parameter defining an option on an underlying asset and second input data corresponding to at least one current market condition relating to the underlying asset, wherein said first input data comprises an indication of at least one of a type of said option, an expiration date of said option, a trigger for said option, and a strike of said option;
computing a bid/offer spread of the option based on the first input data and the second input data; and
computing at least one of a bid price and an offer price of said option based on said bid/offer spread.

33. The machine-readable medium according to claim 32, wherein said second input data comprises an indication of at least one of a spot value, an interest rate, a volatility, an at-the-money volatility, a 25 delta risk reversal, a 25 delta butterfly, and a 25 delta strangle.

34. The machine-readable medium according to claim 32, wherein said instructions result in providing an output corresponding to at least one of the bid price and the offer price of said option.

35. The machine-readable medium according to claim 32, wherein said instructions result in communicating at least one of the bid price and the offer price of said option via a communication network.

36. The machine-readable medium according to claim 32, wherein the instructions result in automatically computing said bid/offer spread.

37. The machine-readable medium according to claim 32, wherein the instructions result in computing said bid/offer spread based on a corrected-theoretical-value of said option.

38. The machine-readable medium according to claim 32, wherein the instructions result in: computing a base value for the bid/offer spread using at least part of said first and second input data; and computing said bid/offer spread by correcting said base value using at least part of said first and second data.

39. The machine-readable medium according to claim 38, wherein the instructions result in: computing a plurality of bid/offer spread corrections based on at least part of said first and second input data; and applying said plurality of bid/offer spread corrections to said base value.

40. The machine-readable medium according to claim 39, wherein at least one of said plurality of bid/offer spread corrections is a function of at least one factor related to a risk involved in said option.

41. The machine-readable medium according to claim 40, wherein said plurality of bid/offer spread corrections comprise at least one of a convexity correction, a risk reversal correction, a shift correction, a gearing correction, a Vega correction, and an intrinsic value correction.

42. The machine-readable medium according to claim 39, wherein the instructions result in: computing a bid/offer spread correction weight corresponding to one or more of said bid/offer spread corrections; multiplying said one or more bid/offer spread corrections by the corresponding bid/offer spread correction weight yielding weighted bid/offer spread corrections; and adding said weighted bid/offer spread corrections to said base value.

43. The machine-readable medium according to claim 42, wherein at least one of said bid/offer spread correction weights is time dependent.

44. The machine-readable medium according to claim 32, wherein said underlying asset comprises a financial asset.

45. The machine-readable medium according to claim 44, wherein said option is a foreign exchange (FX) option, a Vanilla option; an option-like financial derivative, or an exotic option.

46. The machine-readable medium according to claim 32, wherein said instructions result in receiving said second input data via a communication network.

47. The machine-readable medium according to claim 32, wherein said underlying asset is related to at least one of a commodity, a stock, a bond, an interest rate, and the weather.

* * * * *